United States Patent [19]
Yamamoto

[11] Patent Number: 5,107,948
[45] Date of Patent: Apr. 28, 1992

[54] RUNNING STATE CONTROL SYSTEM FOR MOTOR VEHICLE

[75] Inventor: Isao Yamamoto, Sagamihara, Japan

[73] Assignee: Nissan Motor Co., Ltd., Japan

[21] Appl. No.: 596,117

[22] Filed: Oct. 11, 1990

[30] Foreign Application Priority Data

Oct. 24, 1989 [JP] Japan .................................. 1-274793

[51] Int. Cl.⁵ ........................................... B60K 31/00
[52] U.S. Cl. .................................... 180/197; 180/179;
364/426.02
[58] Field of Search ............... 180/197, 170, 178, 179,
180/177; 364/424.1, 426.02, 426.04, 431.07

[56] References Cited

U.S. PATENT DOCUMENTS

| | | | |
|---|---|---|---|
| 4,421,192 | 12/1983 | Ito et al. ................................ | 180/179 |
| 4,697,478 | 10/1987 | Mastumoto et al. ............ | 180/179 X |
| 4,835,696 | 5/1989 | Suzuki et al. ..................... | 180/179 X |
| 4,951,208 | 8/1990 | Etoh ................................... | 180/197 X |
| 4,987,966 | 1/1991 | Fujita ................................ | 180/170 X |

FOREIGN PATENT DOCUMENTS 59-58134 4/1984 Japan .
62-91326 4/1987 Japan .

*Primary Examiner*—Mitchell J. Hill
*Attorney, Agent, or Firm*—Lowe, Price, LeBlanc & Becker

[57] ABSTRACT

A running state control system for a motor vehicle comprises a traction control apparatus for controlling the traction of the motor vehicle, and a speed control apparatus for regulating a vehicle speed to a setting. The speed control apparatus is connected with the traction control apparatus via a signal line, and includes speed control correcting means. The speed control correcting means inhibit the speed control apparatus from outputting an opening operation signal to a mechanical throttle valve, and a down-shift signal to an automatic transmission while the traction control apparatus outputs a traction control signal. Additionally, the speed correcting means command the speed control apparatus to output a signal so as to slowly return the mechanical throttle valve when the operation of the speed control apparatus is interrupted while the traction control apparatus outputs the traction control signal.

7 Claims, 3 Drawing Sheets

RUNNING STATE CONTROL SYSTEM FOR MOTOR VEHICLE

BACKGROUND OF THE INVENTION

The present invention relates to a running state control system for a motor vehicle.

Some modern motor vehicles are equipped with a speed control apparatus which automatically controls a vehicle speed to a setting established by a driver.

Such a speed control apparatus is disclosed, for example, in JP-A 59-58134. When driving a motor vehicle having a speed control apparatus of this type, a driver accelerates the vehicle up to a speed at which he desires to run it in a constant manner, then, he presses a vehicle speed setting button to set the speed. Under these conditions, the vehicle undergoes a speed control to adjust the vehicle speed to a setting by regulating an opening degree of a throttle value or a carburetor.

This speed control function is useful for the driver when driving on a superhighway at a constant speed, because continuous depression of an accelerator pedal is not needed. This function is canceled when the driver depresses a clutch pedal or a brake pedal. The vehicle is accelerated over the setting when the accelerator pedal is depressed, whereas the vehicle is decelerated by an engine brake, then runs again at the set speed in a constant manner when the accelerator pedal is released.

On the other hand, some modern motor vehicles are equipped with a traction control apparatus to prevent a skid of driving wheels.

Such driving force control apparatus is disclosed, for example, in JP-A 62-91326. With a motor vehicle having a traction control apparatus of this type, when the vehicle undergoes a sudden acceleration during starting period on a road with extremely low friction coefficient such as a frozen road, or when the vehicle makes a skid during a slow acceleration upon high speed run, an advanced reduction in traction of the vehicle is possible in accordance with the magnitude of a skid ratio and/or a variation thereof. Thus, the high running stability is assured in any running pattern.

To decrease the traction of the vehicle, a throttle valve called "second throttle valve" is closed. This second throttle valve is connected in series with a mechanical throttle valve which is opened by a known accelerator pedal. The second throttle value is completely opened and is closed by a closing operation signal from the traction control apparatus. The traction is determined by that one of the mechanical throttle valve and the second throttle valve which is more closed.

If a running state control system for a motor vehicle is of a combination of the known speed control apparatus and traction control apparatus, there arise the following problems:

1—Referring to FIG. 3, when the traction control apparatus closes the second throttle valve on a road with low friction coefficient, the vehicle speed is decreased as indicated by a portion B of a characteristic curve 1. If the speed control apparatus is in operation then, the mechanical throttle valve will be opened by a command of the speed control apparatus as indicated by a portion $A_1$ of a characteristic curve 3.

Under such conditions, when the vehicle comes to a road with friction coefficient (point a in FIG. 3), the traction control apparatus opens the second throttle valve in an instant (point b in FIG. 3). On the other hand, the speed control apparatus, which is relatively slow in response, gradually opens the mechanical throttle valve as indicated by a portion $A_2$ of the characteristic curve 3.

This results in a temporary generation of a traction greater than the required one to keep a vehicle speed C set in the speed control apparatus. Thus, when the vehicle comes again to the road with high friction coefficient, the vehicle undergoes a quick acceleration as indicated by a portion $B_1$ of the characteristic curve 1, resulting in a run at a speed over the set speed C as indicated by a portion $B_2$ of the characteristic curve 1.

This is due to presence of the opening operation signal to the mechanical throttle valve outputted by the speed control apparatus during the driving force control.

2—When the speed control apparatus is mounted to the motor vehicle having an automatic transmission, one of the functions of this apparatus is to recover the vehicle speed by increasing the traction of the vehicle based on an automatic down-shift of the gear position when the vehicle comes to a rise in the road, and that the vehicle speed becomes less than the setting by a predetermined value or more.

When the traction control apparatus is in operation on the road with low friction coefficient, however, an increase in traction by the down-shift of the gear position is not effective.

3—If the operation of the speed control apparatus in to be discontinued, the mechanical throttle valve which is opened then will be closed with the least possible delay.

However, if this closing operation of the mechanical throttle valve takes place on the road with low friction coefficient where the traction control apparatus begins to function, the running stability of the vehicle may be decreased due to quick reduction in traction of the vehicle.

SUMMARY OF THE INVENTION

It is, therefore, an object of the present invention to provide a running state control system for a motor vehicle which is simply constructed with a combination of a speed control apparatus and a traction control apparatus, and free of the aforementioned defects.

It is another object of the present invention to provide a running state control system for a motor vehicle which allows the speed control apparatus to perform the speed control with high running stability when the traction control apparatus is in operation.

According to one aspect of the present invention, there is provided system for controlling a running state of a motor vehicle, comprising:

traction control means for controlling the traction of the motor vehicle; and speed control means for regulating a vehicle speed to a setting, said speed control means being connected with said traction control means, said speed control means including speed control correcting means, said speed control correcting means including:

means for determining whether said traction control means is in operation and generating a traction control indicative signal while said traction control means is in operation; and means for inhibiting said speed control means from outputting a signal to increase the traction of the motor vehicle while said traction control indicative signal is present.

According to another aspect of the present invention, there is provided, in a method of controlling a running state of a motor vehicle, the motor vehicle including:

traction control means for controlling the traction of the motor vehicle; and speed control means for regulating a vehicle speed to a setting, said speed control means being connected with said traction control means, said speed control means including speed control correcting means, determining whether said traction control means is in operation and generating a traction control indicative signal while said traction control means is in operation; and inhibiting said speed control means from outputting a signal to increase the traction of the motor vehicle while said traction control indicative signal is present.

According to still another aspect of the present invention, there is provided, in a motor vehicle:

an automatic transmission;

a first throttle valve;

a second throttle valve disposed in series with said first throttle valve;

traction control means for controlling the traction of the motor vehicle; and speed control means for regulating a vehicle speed to a setting, said speed control means being connected with said traction control means, said speed control means including speed control correcting means, said speed control correcting means including:

means for determining whether said traction control means is in operation and generating a traction control indicative signal while said traction control means is in operation; and means for inhibiting said speed control means from outputting an opening operation signal to said first throttle valve while said traction control indicative signal is present.

According to further aspect of the present invention, there is provided, in a method of controlling a running state of a motor vehicle, the motor vehicle including: a first throttle valve;

a second throttle valve disposed in series with the first throttle valve;

traction control means for controlling traction of the motor vehicle, the traction control means having an electric stepper motor for driving the first throttle valve;

speed control means for controlling a servo actuator operatively connected with the second throttle valve;

the method comprising the steps of:

determining whether or not said traction control means generates a vehicle torque suppressing signal; and inhibiting said servo actuator from effecting an opening operation of said second throttle valve in response to the vehicle torque suppressing signal.

DETAILED DESCRIPTION OF THE INVENTION

Referring to the accompanying drawings, a preferred embodiment of a running state control system for a motor vehicle according to the present invention will be described.

Figure 1:
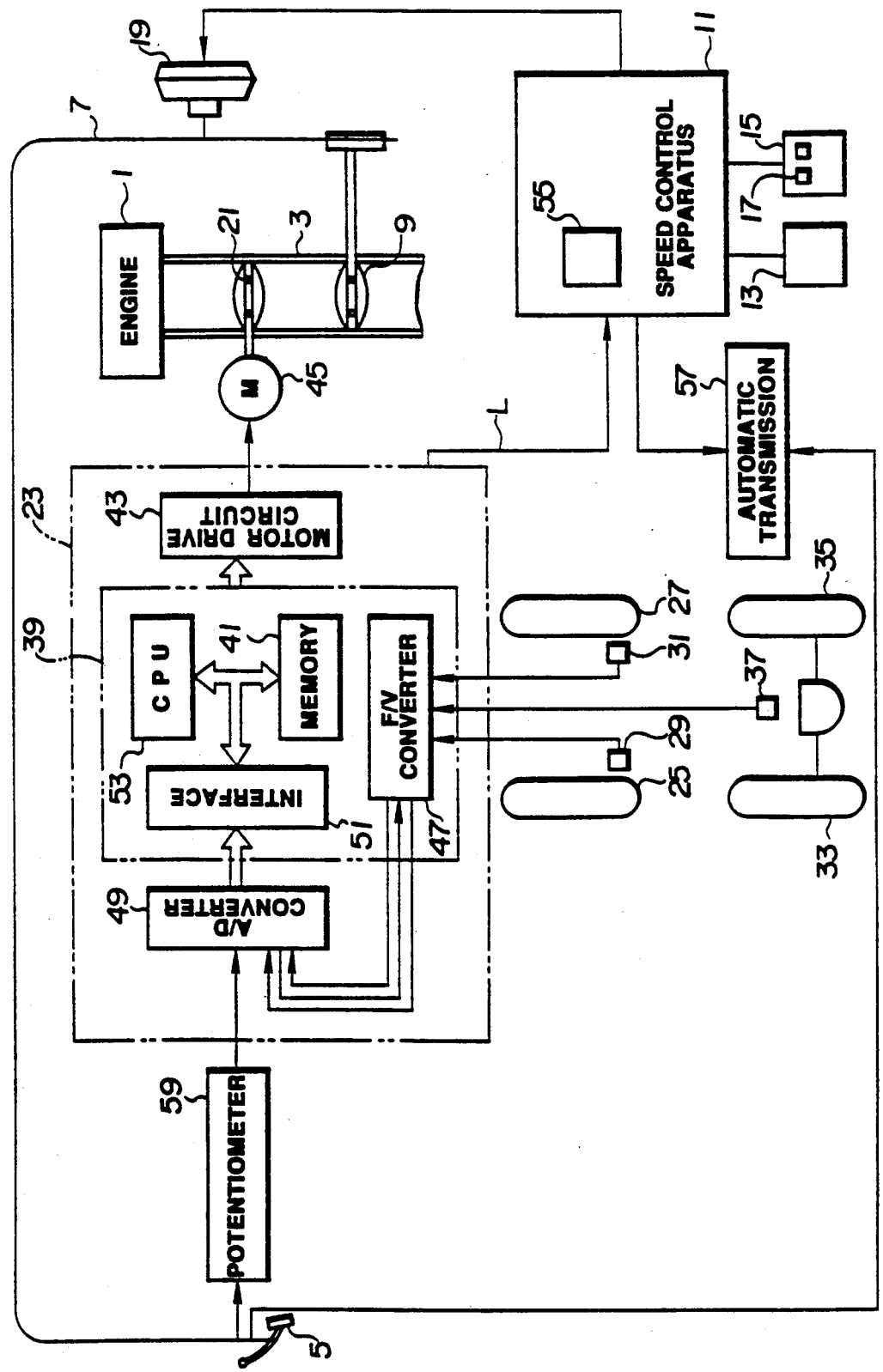
FIG. 1 is a block diagram illustrating a preferred embodiment of a running state control system for a motor vehicle according to the present invention.

Referring to FIG. 1, a mechanical throttle valve 9 is arranged in a throttle chamber 3 which is connected to an engine 1 of a motor vehicle. The mechanical throttle valve 9 is operated by an accelerator pedal 5 through an accelerator wire 7, and it is also operated by a command of a speed control apparatus 11 which adjusts a vehicle speed to a setting.

The speed control apparatus 11 includes a microcomputer, and speed control corrrecting means 55 which will be described hereinafter. This speed control apparatus 11 receives a signal indicative of the vehicle speed detected by a vehicle speed sensor 13. If a vehicle speed setting button 17 of a control switch 15 is pressed when a desired vehicle speed is obtained, this vehicle speed is set or stored as a setting in the speed control apparatus 11. In order to adjust the vehicle speed to the setting, an actuator 19 controls opening and closing operation of the mechanical throttle valve 9 by a command of the speed control apparatus 11. A speed control function of the apparatus 11 which is established in a manner as described above is canceled by depressing a brake pedal or a clutch pedal.

In the throttle chamber 3, a second throttle valve 21 is arranged in series with the mechanical throttle valve 9. The second throttle valve 21 is operated by a command of a traction control apparatus 23 which performs the traction control so as to minimize a skid of driving wheels (right and left rear wheels 35 and 33 in FIG. 1).

The traction control apparatus 23 includes a microcomputer 39 having a central processing unit (CPU) 53, a memory 41, an interface circuit 51, and a frequency-to-voltage (F/V) converter 47, an analogue-to-digital (A/D) converter 49, and a motor drive circuit 43. Rotational speeds of two coupled driving wheels (right and left front wheels 27 and 25 in FIG. 1) are detected by two rotational speed sensors 31 and 29, respectively, whereas an average rotational speed of the two driving wheels 35 and 33 is detected by a rotational speed sensor 37. These rotational speeds detected by the rotaional speed sensors 31, 29, and 37 are converted into voltage values by the F/V converter 47, respectively. The voltage values are in turn converted into digital values by the A/D converter 49, respectively. Via the interface circuit 51, the digital values are provided to the CPU 53 in which actual skid state indicative values such as a skid ratio and a skid ratio variation are calculated. The CPU 53 provides a command to the motor drive circuit 43 so as to adjust the actual skid state indicative values to corresponding skid state setting values stored in the memory 41, respectively. Based on a signal from the motor drive circuit 43, the stepper motor 45 controls opening and closing operation of the second throttle valve 21, thus minimizing the skid of the driving wheels 35 and 33.

The CPU 53 compares the actual skid state indicative values with the corresponding skid state setting values stored in the memory 41, respectively. By way of example, if the actual skid state indicative values are more than the corresponding skid state setting values by predetermined values, respectively the CPU 53 provides a command to close the second throttle valve 21 which is completely opened until then. On the other hand, if the skid of the driving wheels 35 and 33 becomes smaller due to decrease in traction thereof, i.e., the actual skid state indicative values are less than the corresponding skid state setting values by predetermined values, respectively, the CPU 53 provides a command to open the second throttle valve 21.

In order to transmit a signal indicative that a traction control signal is present, the speed control apparatus 11 is connected to the traction control apparatus 23 via a signal line L.

When the speed control apparatus 11 is in operation and is receiving the signal inputted from the traction control apparatus 23 via the signal line L, the speed control correcting means 55 inhibits the speed control apparatus 11 from outputting not only an opening operation signal to the mechanical throttle valve 9, but a down-shift signal to an automatic transmission 57 of the vehicle. Additionally, when the operation of the speed control apparatus 11 is interrupted, the speed control correcting means 55 commands the actuator 19 to reduce a return speed of the mechanical throttle valve 9 so as to prevent it returning suddenly in a closing direction thereof.

A depression amount of the accelerator pedal 5 is detected by a potentiometer 59, and the depression amount detected is provided to the A/D converter 49.

Next, the control executed in this embodiment will be described.

Figure 2:
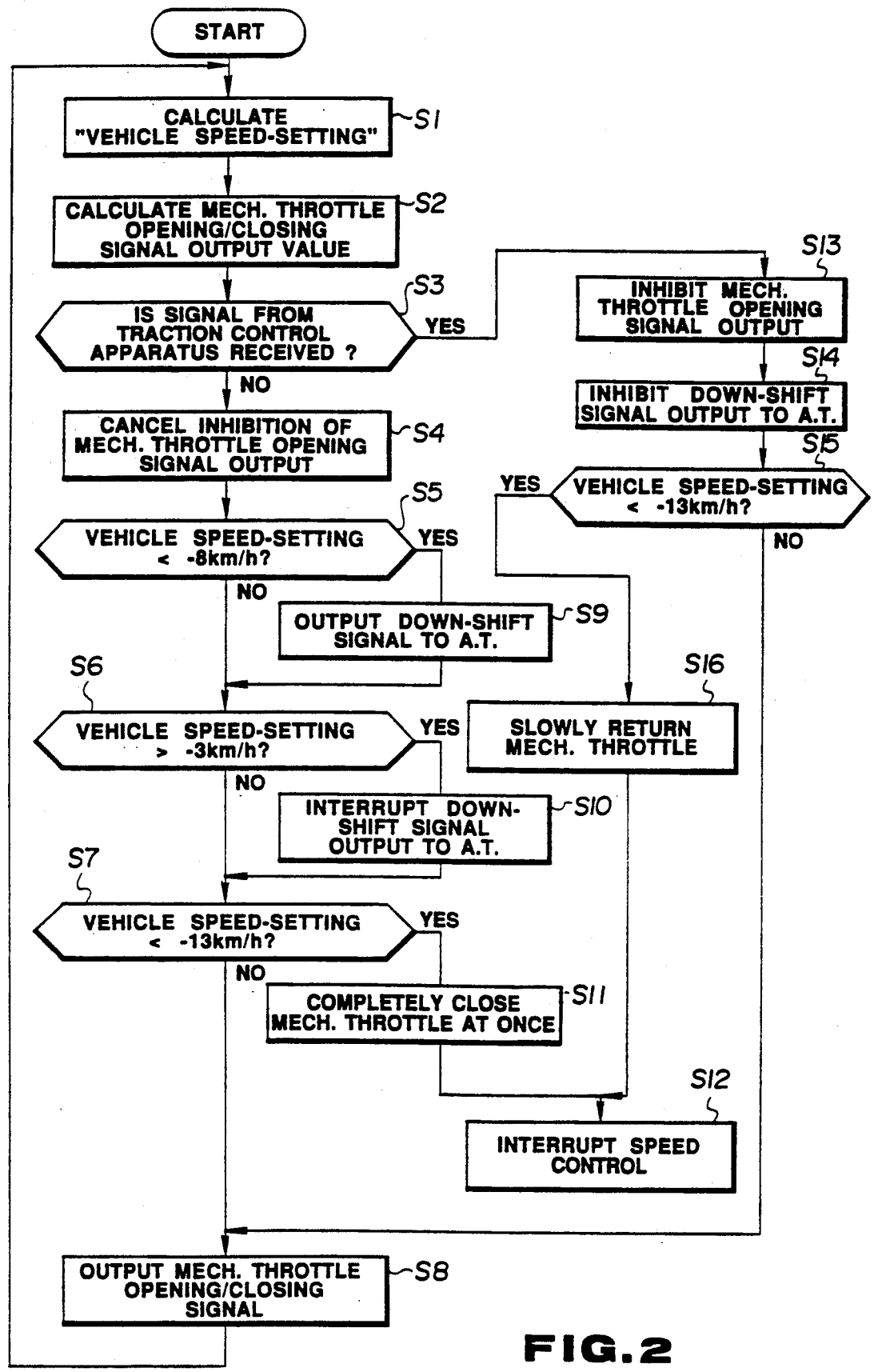
FIG. 2 is a flowchart showing the control executed in the embodiment.

Referrring to FIG. 2, at a step S1, a difference "vehicle speed-setting" is caluculated. The vehicle speed is detected by the vehicle speed sensor 13. And, when the desired vehicle speed is obtained, the vehicle speed setting button 17 is pressed to set or store this vehicle speed in the speed control apparatus 11.

At a step S2, an output value of opening or closing operation signal to the mechanical throttle valve 9 is calculated so as to perform the speed control in accordance with the difference "vehicle speed-setting". Specifically, in accordance with this difference, the speed control apparatus 11 provides to the actuator 19 an opening operation signal or a closing operation signal to the mechanical throttle valve 9. Based on the signal, the valve 9 is opened or closed by the actuator 19, thus adjusting the vehicle speed to the setting.

At a subsequent step S3, it is checked whether or not the speed control apparatus 11 is receiving the signal from the traction control apparatus 23 via the signal line L. When the actual skid state indicative values which are detected by the rotational speed sensors 31, 29, and 37, then calculated by the CPU 53 are less than the corresponding skid state setting values by predetermined values, respectively, the speed control apparatus 11 is not receiving the signal from the traction control apparatus 23.

At a subsequent step S4, the second throttle valve 21 is kept completely opened, and the inhibition of the output of the opening operation signal to the mechanical throttle valve 9 is canceled. Thus, on a road with high friction coefficient, the vehicle underdergoes the speed control.

At a subsequent step S5, it is checked whether vehicle speed-setting<-8 km/h or not. At a step S6, it is checked whether vehicle speed-setting<-3 km/h or not. And, at a step S7, it is checked whether vehicle speed-setting<-13 km/h or not. If all the answers to the inquiries at the steps S5, S6, and S7 are NO, the control proceeds to a subsequent step S8.

At the step S8, the speed control apparatus 11 provides to the actuator 19 an opening operation signal or a closing operation signal to the mechanical throttle valve 9. That is, even if the vehicle speed becomes less than the setting, the speed control is continued if the difference between the two is less than 13 km//h.

On the other hand, at the steps S5, if the vehicle speed becomes less than the setting, and that the difference between the two is more than 8 km/h, (which occurs when the vehicle comes to a rise in the road), the control proceeds to a step S9 where a down-shift signal is provided to the automatic transmission 57, thereby increasing the traction of the vehicle, resulting in recovery of the vehicle speed. Then, the control proceeds from the step S9 to the step S6.

At the step S6, if the vehicle speed becomes less than the setting, and that the difference between the two is lesss than 3 km/h, the control proceeds to a step S10 where the output of the down-shift signal to the automatic transmission 57 is interrupted, thus returning to the previous gear position. Then, the control proceeds from the step S10 to the step S7.

At the step S7, if the vehicle speed becomes less than the setting, and the difference between the two is more than 13 km/h, (which occurs when the vehicle is braked), the control proceeds to a step S11 where the mechanical throttle valve 9 is completely closed at once. Subsequently, at a step S12, the operation of the speed control apparatus 11 is interrupted.

Referring again to FIG. 3, the behavior of the vehicle which undergoes the control as described above is schematically indicated by a portion of each of the characteristic curves 1-3 on the left side of a point c.

When coming to the road with low friction coefficient, the vehicle makes an increased skid of the driving wheels 35 and 33. And, if the actual skid state indicative values calculated are more than the corresponding skid state setting values stored by predetermined values, respectively, the traction control apparatus 23 provides a signal to the stepper motor 45 via the motor drive circuit 43 so as to close the second throttle valve 21, thus achieving decrease in traction of the vehicle.

Figure 3:
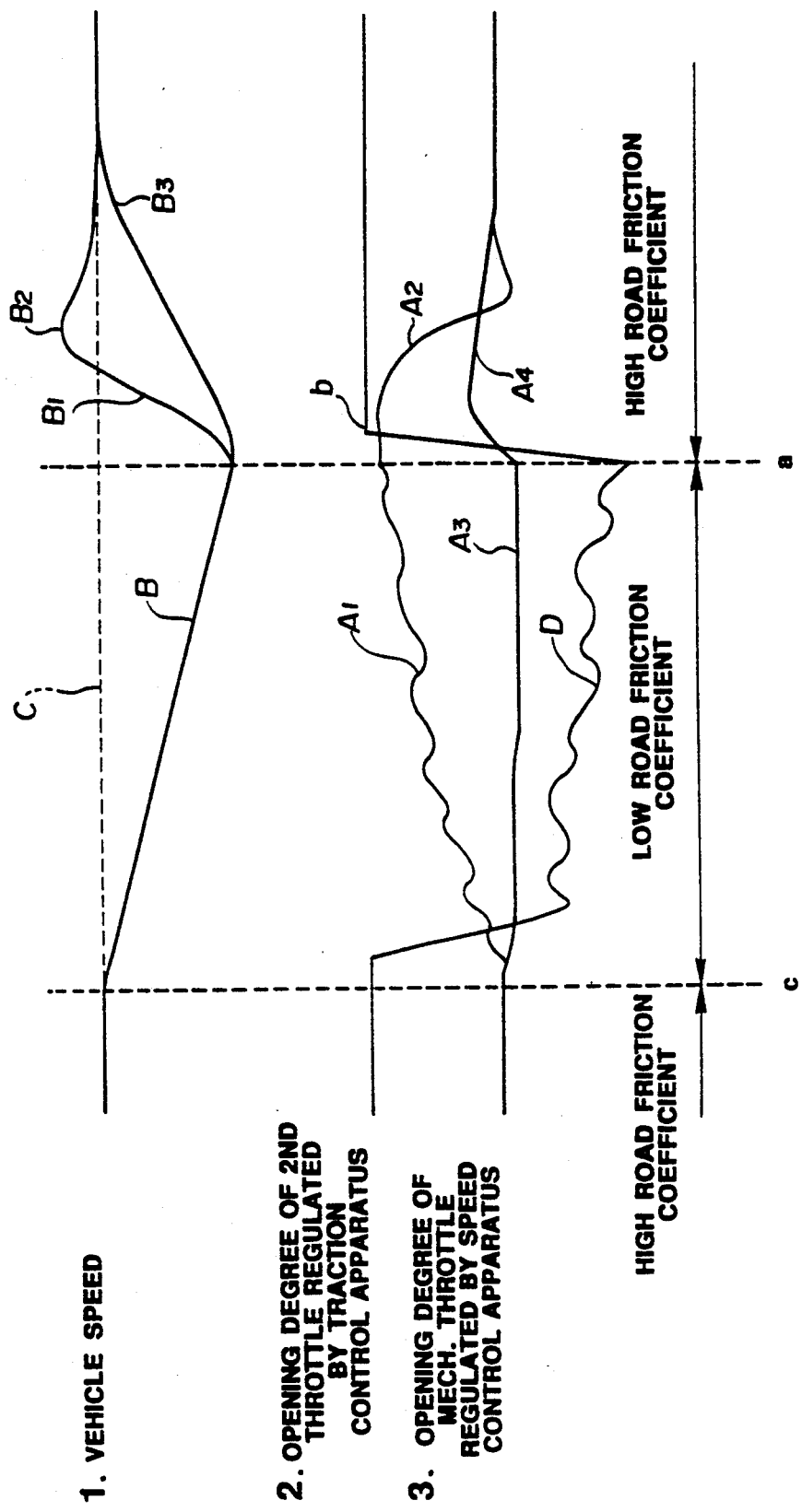
FIG. 3 is a graphical representation of characteristic curves showing the behavior of the motor vehicle in accordance with a road friction coefficient.

Thereafter, as indicated by a portion D of the characteristic curve 2 in FIG. 3, the traction control apparatus 23 controls opening and closing operation of the second throttle valve 21 so as to obtain the actural shid state indicative values less than the corresponding skid state setting values by predetermined values, respectively.

At the same time, the speed control apparatus 11 receives the signal from the traction control apparatus 23 via the signal line L, i.e., the answer to the inquiry at the step S3 is YES. Thus, the control proceeds from the S3 to a step S13.

At the step S13, the speed control correcting means 55 provides a command to the speed control apparatus 11 so as to inhibit the output of the opening operation sighal to the mechanical throttle valve 9. Subsequently, at a step S14, the speed control correcting means 55 provides a command to the speed control apparatus 11 so as to inhibit the output of the down-shift signal to the automatic transmission 57.

Thus, even if the traction control apparatus 23 opens the second throttle valve 21 in an instant when the vehicle comes again to the road with high friction coefficient, the traction of the vehicle does not exceed a leve necessary to keep the vehicle speed set in the speed control apparatus 11 due to relatively small opening degree of the mechanical throttle valve 9, i.e., the vehicle speed does not exceed the setting. Further, since the output of the down-shift signal to the automatic transmission 57 is inhibited, an increase in traction due to down-shift of the automatic transmission 57 is presented on the road with low friction coefficient.

At a subsequent step S15, it is checked whether vehicle speed-setting <-13 km/h or not. If the vehicle speed becomes less than the setting, and the difference between the two is more than 13 km/h, the control proceeds from the step S15 to a step S16 where the speed control correcting 55 provide a command to the speed control apparatus 11 so as to slowly return the opened mechanical throttle valve 9 in the closing direction thereof. This is indicated by a portion $A_3$ of the characteristic curve 3 in FIG. 3, Subsequently, at the step S12, the operation of the speed control apparatus 11 is interrupted, thus obtaining decreased skid of the driving wheels 35 and 33.

When the vehicle comes to the road with low friction coefficient and; the operation of the speed control apparatus 11 is interrupted, the mechanical throttle valve 9 is slowly returned to the closed position by the actuator 19 based on" the command of the speed control correcting means 55, thus preventing a sudden decrease in traction of the vehicle, resulting in high running stability thereof.

As indicated by the characteristic curves on the right side of the point a in FIG. 3, if the vehicle makes a decreased skid of the driving wheels 35 and 33 when going through the road with low friction coefficient, and coming again to the road with high friction coefficient, the traction control is interrupted so as to open the second throttle valve 21 completely, and the mechanical throttle valve 9 in accordance with the vehicle speed as indicated by a portion $A_4$ of the characteristic curve 3, resulting in recovery of the vehicle speed as indicated by a portion $B_3$ of the characteristic curve 1.

In this embodiment, the vehicle running state control system of the present invention is simply condtructed, having the speed control apparatus 11 and traction control apparatus 23 of the well known type with the signal line L and control program being added.

It is to be understood that the operations of the traction control and the speed control shown in this embodiment are illustrative and not restrictive, and the present invention may be practiced in the other types of operations thereof.

What is claimed is:

1. In a motor vehicle:
   an automatic transmission:
   a first throttle valve:
   a second throttle valve disposed in series with said first throttle valve;
   traction control means for controlling the traction of the motor vehicle: and
   speed control means for regulating a vehicle speed to a predetermined setting, said speed control means being connected with said traction control means including speed control correcting means,
   said speed control correcting means including:
   means for determining whether said traction control means is in operation and generating a traction control indicative signal when said traction control means is in operation;
   means for inhibiting said speed control means from outputting an opening operation signal to said first throttle valve when said speed control means is in operation and said traction control indicative signal is generated;
   means for inhibiting said speed control means from outputting a down-shift signal to said automatic transmission when said speed control means is in operation and said traction control indicative signal is generated;
   first determining means for determining whether the vehicle speed deviates from said predetermined setting by an amount greater than a first threshold value and generating a first difference signal indicative of a deviation greater than said first threshold; and
   first commanding means for commanding said speed, control means to output a signal so as to return said first throttle valve to a closed position at a first rate of speed when operation of said speed control means is inhibited and said first difference signal and said traction control indicative signal are generated.

2. A motor vehicle as claimed in claim 1, wherein said first throttle valve includes a mechanical valve.

3. A motor vehicle as claimed in claim 1, wherein said speed control correcting means further includes second determining means for determining whether the vehicle speed deviates from said predetermined setting by an amount greater than a second threshold value indicative of a braking operation and generating a secondo difference signal indicative of the deviation exceeding said second threshold value, and
   second means responsive to said second difference signal for commanding said speed control means to output a signal to return said first throttle valve to a closed direction at a second predetermined rate of speed greater than said first rate of speed thereby providing a more rapid return of said first throttle to the closed position thereof under control of said speed control means during a braking operation and a slower return of said first throttle to the closed position when said traction control means is operating and said speeed control means is inhibited.

4. A motor vehicle a claimed in claim 3 wherein said first and second threshold values are substantially identical, said first and second determining means thereby outputting said first and second difference signals in response to substantially identical deviation of said vehicle speed from said predetermined setting.

5. In a method of controlling a running state of a motor vehicle, the motor vehicle including:
   an automatic transmission;
   a first throtttle valve;
   a second throttle valve disposed in series with the first throttle valve;
   traction control means for controlling traction of the motor vehicle, the traction control means having an electric stepper motor for driving the second throttle valve;
   speed control means for controlling a servo actuator operatively connected with the first throttle valve for regulating a vehicle speed to a predetermined setting;
   the method comprising the steps of:
   when the speed control means is maintained in operation, determining whether the traction control means generates a vehicle torque suppressing signal;

inhibiting the servo actuator from effecting an opening operation of the first throttle valve in response to said vehicle torque suppressing signal and inhibiting the speed control means from outputting a down-shift signal to the automatic transmission in response to said vehicle torque suppressing signal;

determining whether the traction control means generates a first difference signal indicative of a difference between the vehicle speed and the predetermined setting being greater than a predetermined first threshold value; and when operation of the speed control means is inhibited, commanding the speed control means to output a signal so as to return the first throttle valve to a closed position at a first rate of speed in response to said vehicle torque suppressing signal and said first difference signal.

6. A method as recited in claim 5, comprising the further steps of:

when the speed control means is maintained in operation, determining whether the vehicle speed deviates from said predetermined setting by an amount greater than a second predetermined threshold value indicative of a braking operation and generating a second difference signal indicative of the deviation exceeding said second threshold value, and commanding the speed control means to output a signal so as to return the first throttle valve to a closed position at a second rate of speed greater than said first rate of speed in response to said second difference signal.

7. A method as recited in claim 6 wherein said first and second threshold values are substantially identical.

* * * * *